United States Patent [19]

Richards et al.

[11] Patent Number: 4,924,495
[45] Date of Patent: May 8, 1990

[54] ENHANCED COMMUNICATION SERVICES AND APPARATUS

[76] Inventors: Philip C. Richards, 59 Old Highway, Wilton, Conn. 06897; Robert T. Evans, 28 Sunset Dr., Weston, Conn. 06883

[21] Appl. No.: 239,402
[22] Filed: Sep. 1, 1988
[51] Int. Cl.$^5$ ...................... H04M 3/02; H04M 15/00
[52] U.S. Cl. ..................................... 379/127; 379/229
[58] Field of Search ............... 379/127, 134, 205, 115, 379/121, 229

[56] References Cited

U.S. PATENT DOCUMENTS 4,757,267 7/1988 Riskin .................................. 329/201

Primary Examiner—Stafford D. Schreyer

[57] ABSTRACT

A method for communicating between a first communication terminal and any selected one of a group of second remotely disposed compatible communication terminals using a designated communication service of a designated common carrier having at least one toll switch connectable via local telephone company central offices between the first terminal and any selected second terminal. Each second terminal has at least one different postal zip code assigned thereto that designates the geographical location thereof. Each second terminal is provided with means to receive a designated security code of digits from a toll switch which identifies the designated service, means to record the time, date and type of call identified by the designated security code, means to initiate receipt of any message transmitted thereto, means responsive to the end of any message transmitted thereto to terminate reception and to send an end of reception signal to said toll switch.

6 Claims, 3 Drawing Sheets

ENHANCED COMMUNICATION SERVICES AND APPARATUS

BACKGROUND OF THE INVENTION

The present invention is directed toward enhanced communication services utilizing known local and long distance telephone carriers wherein individual users of such services utilize, in addition to other conventional dialing codes, postal zip codes which are dialed as part of normal telephone dialing without additional prompting such as second dial tone.

SUMMARY OF THE INVENTION

In accordance with the principles of the invention, a method is established for communicating between a first communication terminal and any selected one of a group of second remotely disposed compatible communication terminals. The method uses a designated communication service of a designated common carrier having at least one toll switch connectable via local telephone company central offices between the first terminal and any selected second terminal. Each second terminal has at least one different postal zip code assigned thereto that designates the geographical location thereof. Each second terminal is provided with means to receive a designated security code from a toll switch which identifies the designated service, means to record the time, date and type of call identified by the designated security code, means to initiate receipt of any message transmitted thereto, means responsive to the end of any message transmitted thereto to terminate reception and to send an end of reception signal to said toll switch.

The method employs the following steps:

[a] selection at the first terminal of any one of said second terminals;

[b] dialing at the first terminal the number 1-0xx-x17-00yy plus the zip code of the selected second terminal where xxx is the occasional user carrier access code for said carrier and yy deisgnate any two digits, each digit having a value from one to nine, other than the combination of five and five [55] as assigned by the designated common carrier to identify the selected communication service, the call progressing automatically through a local central office connected to the first terminal, at least one toll switch and a local central office connected to the selected second terminal;

[c] automatically sending an acknowledgement of receipt of the call from the selected second terminal to a toll switch;

[d] upon receipt of the acknowledgement by said toll switch, automatically sending said security code from said toll switch to the selected second terminal;

[e] verification at the selected second terminal upon receipt of the security code by the selected second terminal that the received security code authenticates the designated service;

[f] recording at the selected second terminal the time, date and type of call defined by the received security code;

[g] initiating receipt of the call at the selected second terminal;

[h] terminating such receipt at the selected second terminal when said call reception ends; and

[i] automatically sending an end of message signal from the selected second terminal whereby said toll switch records all billing information concerning the call.

In a preferred form of the invention, originating enhanced facsimile [FAX] services are made available to anyone via private or public access FAX machines. The enhancements include the ability to transmit documents to any destination whether or not the recipients possess FAX machines and to accept "send paid" documents so that the recipients will not incur receiving charges. In addition to using the name and address of the recipient, documents are addressed using standard codes for the telephone network and the terminating zip code.

Documents are directed toward predefined receiving stations which are assigned according to the zip code. Once received, at the option of the sender, documents will either be delivered or held for pickup. Delivery verification service is also available to inform the sender that the document has reached the intended recipient, typically by a return telephone call or FAX transmission.

Documents can be sent from any private or public access FAX machine and carried via the telephone network. Arrangements will be made by the provider of the service with the individual local telephone companies and the long distance carriers for the necessary routing and billing services. Operators of the receiving FAX machines will be contracted for by the service provider. Documents once received will be placed in an envelope, addressed and either delivered or held for pick-up. The receiving operator will arrange for delivery or for notifying the recipient when the document is picked up.

The sender will receive a bill against the originating telephone line by the local telephone company or the long distance carrier. The proceeds, less appropriate service feeds, will be remitted to the service provider who will pay the operators of the receiving FAX machines on a periodic basis for services performed.

Each receiving station, in addition to having a standard Group 3 FAX machine, must have an interface unit for connecting into the local telephone line of the receiving operator. The interface unit will provide the necessary functions of:

[a] detecting seizure of the line, both incoming and outgoing;

[b] detecting incoming calling signals;

[c] analyzing these signals;

[d] recording via a printer or other device the time and date of seizure, an identification of the service [whether or not the call is for enhanced FAX services], an identification of need for delivery or pickup service, and changes of date, time or security code;

[e] switching between incoming and outgoing modes automatically; and

[f] displaying current mode.

DETAILED DESCRIPTION OF PREFERRED EMBODIMENTS

Figure 1:
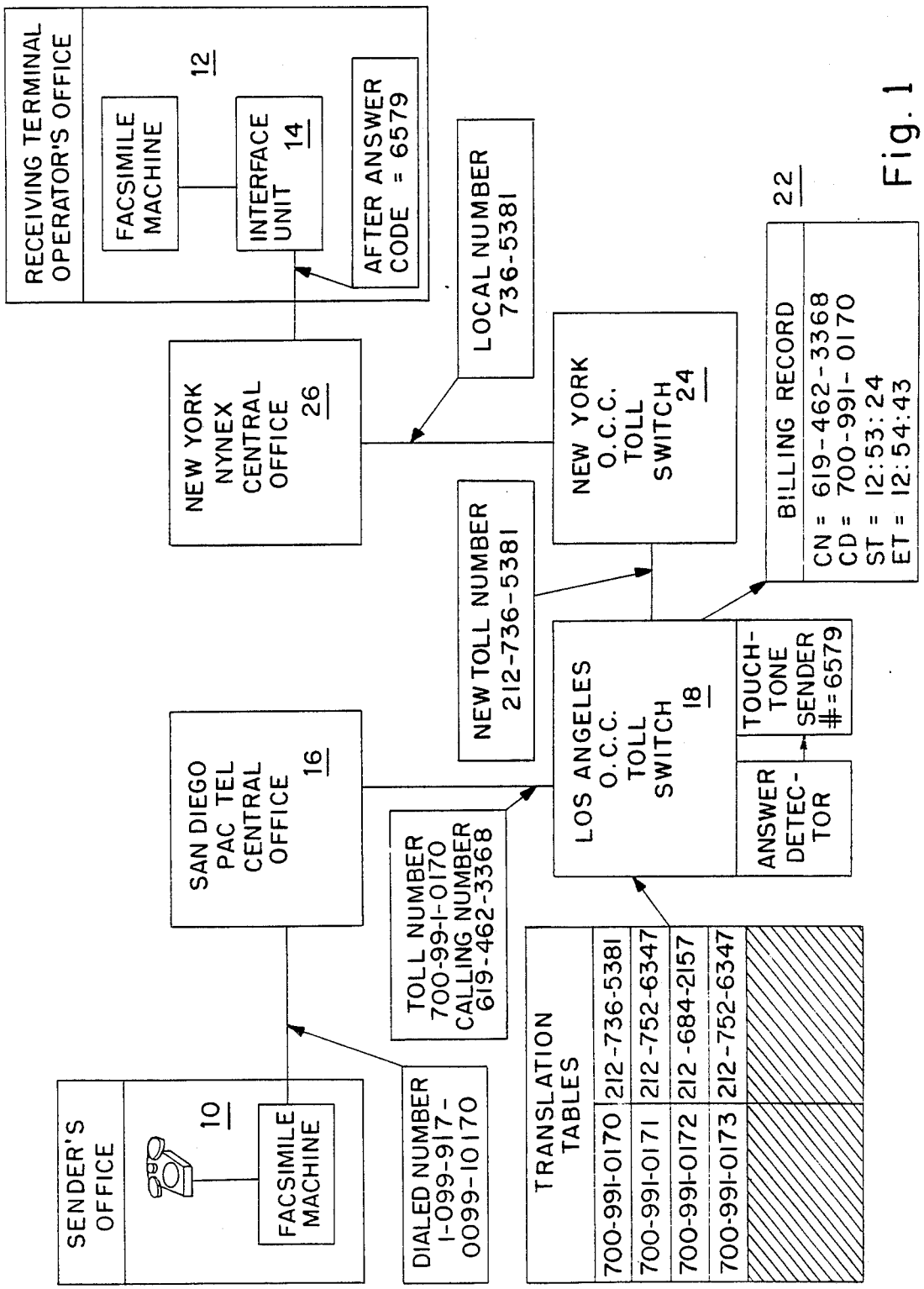
FIG. 1 is a block diagram illustrating system operation in accordance with a preferred embodiment of the invention.

Referring now to FIG. 1, an originator at the senders office 10 dials the number 1-0xx-x17-00yy plus the five digit zip code of the intended recipient. The three X's correspond to the designated long distance carrier access code for non-presubscribed users. This can also be used by users who have prescribed to this carrier but would normally result in their dialing five extra digits. Two alternate methods are available: for users presubscribed to the carrier, they could dial 1-700-yy plus the zip code; for users in non-equal access areas who are customers of the carrier, they could dial their local access number plus their authorization code plus 1-700-yy plus the zip code. The service would not be available to users in non-equal access areas who are not customers of the carrier providing the service routing.

In the above number, the y's represent any configuration of two digits other than 55 chosen by the carrier. One set of y's can be a signal that the FAX is to be held for pickup; another set of y's can be a signal that the FAX is to be delivered. In both cases, the 700-yy-zip code will be converted by the carrier to the regular ten digit code of the receiving terminal operator office 12 with a class mark indicating that special treatment is required after answer.

The call can then be completed through the rest of the network and when answer is detected, a toll switch of the long distance carrier will send forward a four Touch-Tone digit security code that unlocks the special interface unit 14. One combination of digits indicates that pickup service is required; another combination of digits indicates that delivery is needed; all other combinations of digits will be rejected by the unit. The same toll switch will retain a billing record for the call, showing the calling party number, the number dialed, the time the call was answered and the time the call was disconnected.

The unit prints a record of the time at which the call is received and the type of service, pickup or delivery. It also prints the time of all rejected calls and all calls that do not send any digits. The latter are presumed to be those using the FAX machine for purposes other than the enhanced FAX delivery service.

In the specific example shown in FIG. 1, the FAX is to be sent from a San Diego, Calif. sender 10 dialing the number shown via a central office 16 of the San Diego facility of the Pacific Telephone Company which uses the toll number and calling numbers shown to connect to the Los Angeles toll switch 18 of a long distance carrier which uses the translation tables 20 and establishes a billing record 22. Switch 18 employs an answer detector which utilizes a Touch-Tone sender to send out the security code shown and employing the new toll number shown to transmit the call to the New York toll switch 24 of the long distance carrier. Switch 24 transmits the local number to the New York Central office 26 which forwards the call to the interface unit 14 in the receiving office 12. When the interface unit detects ringing, it closes the loop to the central office 26 indicating an answer condition, connects its Touch Tone detector and starts a timer.

In the present example, the carrier access code is 999 and the two digits that signify delivery are 99. Thus the customer dials 10-99-1-700-99-10170, the last five digits being the New York zip code of the receiving terminal office. This number is received by the local office 16 and is directed to the toll switch 18 using the 999 code. The local office not only sends the 700-991-0170 number, it also sends the telephone number [619-462-3368] of the sender office 10. Switch 18 converts the number [700-991-0170] to the destination number [212-736-5381] in New York, using tables 20, and forwards it to switch 24. Switch 24 sends the local number [736-5381] to the central office 26. After answer is detected, switch 18 also outpulses the four digit security code 6597 through switches 24 and 26, calling for delivery. If desired, a receiving office 12 can service more than one zip code. Initially, since zip codes are grouped by blocks of one hundred geographically, an office 12 can serve an entire block of one hundred zip codes, permitting the translation tables to be compressed by converting only hundreds blocks.

After seeing the answer and outpulsing the security code digits 6579, switch 18 records the billing information, including the calling number [CN], the called number [CD] and the time of answer or start time [ST]. When the call is disconnected, the end time [ET] is recorded.

Figure 2:
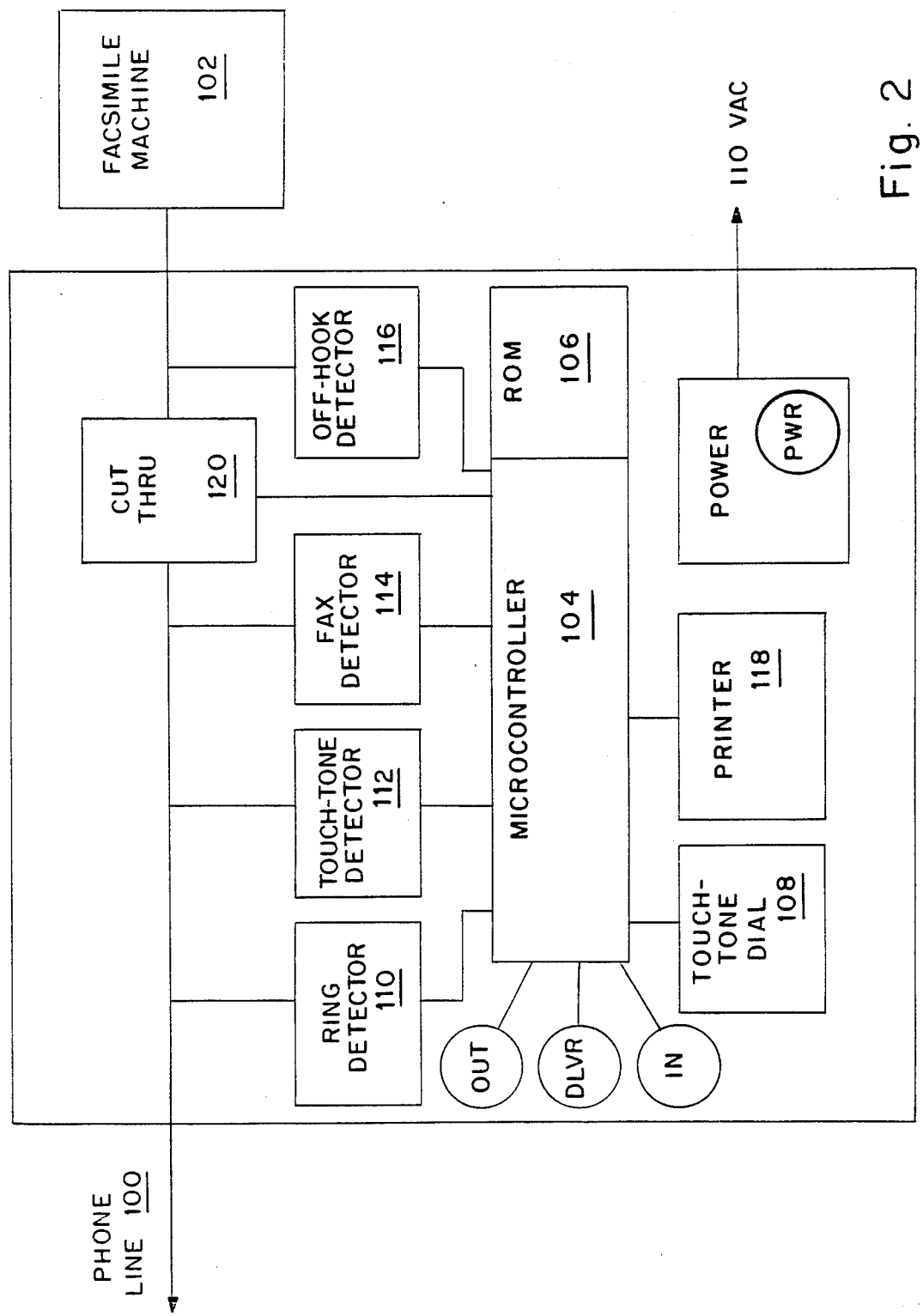
FIG. 2 is a block diagram of an interface unit in accordance with a preferred embodiment of the invention.
Figure 3:
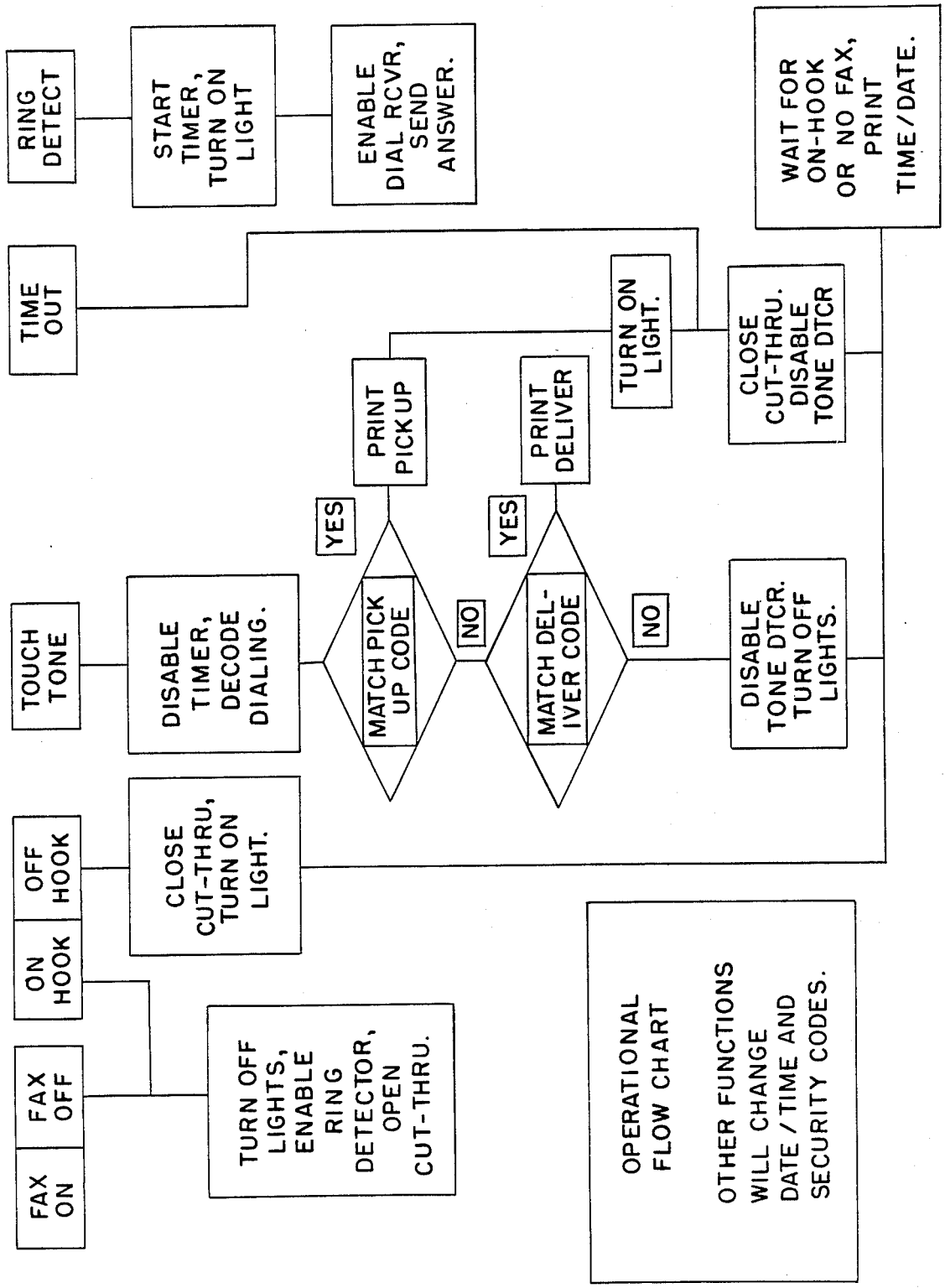
FIG. 3 is a block diagram illustrating the operation of the interface unit shown in FIG. 2.

As shown in FIG. 2, the interface unit 14 is used to connect telephone line 100 to FAX machine 102 using cut-through 120. The unit has a micro-controller 104 with read-only memory 106. Touch-tone dial 108, ring detector 110, Touch-Tone detector 112, FAX detector 114, off-hook detector 116 and printer 118 are all operated via controller 104. The operation functions of the unit 14 are identified separately in FIG. 3.

Unit 14 detects the Touch-Tone security code [6579], prints the time and a flag indicating that delivery service is desired and cuts through the connection to the FAX machine 102. FAX machine 102 detects the presence of a call and sends its modem tone to the originating FAX machine [shown at 10 in FIG. 1]. The two machines proceed to handshake in order to send the FAX message. Had no security code been received after several seconds, the unit would cut through and print a record showing the time and a flag that no special FAX delivery service was requested.

Thereafter, the personnel at the receiving office 12 will correlate the received FAXs with the units printed record and will identify the San Diego FAX as needing delivery service. After appropriate records are made, the FAX will be packed for delivery with the address received on the first page of the FAX. The long distance carrier will process the billing records, calculate the cost based upon the length of the call, and send the billing information to the local telephone company [Pacific Telephone] for inclusion in the next month's bill to the sender. When the local company receives payment, it will forward payment [less a collection fee] to the long distance carrier.

The carrier will deduct the cost of completing the call through its network from the payment and will send the remainder to the service operator with a record of all calls identified by terminating number. The operator will calculate the fees due to the various receiving offices and will pay them. The payments can be verified at each receiving office using the printed record available at the appropriate interface unit.

What is claimed is:

1. A method for communicating between a first communication terminal and any selected one of a group of second remotely disposed compatible communication terminals using a designated communication service of a designated common carrier having toll switches connectable via local telephone company central offices between the first terminal and any selected second terminal, each terminal having at least one different postal zip code assigned thereto that designates the geographical location thereof, each second terminal being provided with means to receive a designated security code from a toll switch which identifies the designated service means to record the time, date and type of call identified by the designated security code, means to initiate receipt of any message transmitted thereto, means responsive to the end of any message transmitted thereto to terminate reception and to send an end of reception signal to said toll switch, said method comprising the steps of:

selection at the first terminal of any one of said second terminals;

dialing at the first terminal the number 1-0xx-x17-00yy plus the zip code of the selected second terminal where xxx is the occasional user carrier access code for said carrier and yy designates any two digits, each digit having a value from one to nine, other than the combination of five and five [55] as assigned by the designated common carrier to identify the selected communication service, the call progressing automatically through a local central office connected to the first terminal, at least one toll switch and a local central office connected to the selected second terminal;

automatically sending an acknowledgement of receipt of the call from the selected second terminal to a toll switch;

upon receipt of the acknowledgement by said toll switch, automatically sending said security code from said toll switch to the selected second terminal;

verification at the selected second terminal upon receipt of the security code by the selected second terminal that the received security code authenticates the designated service;

recording at the selected second terminal the time, date and type of call defined byy the received security code;

initiating receipt of the call at the selected second terminal;

terminating such receipt at the selected second terminal when said call reception ends; and automatically sending an end of message signal from the selected second terminal whereby said toll switch records all billing information concerning the call.

2. The method of claim 1 wherein the actual digits yy constitute an instruction informing the selected second terminal of the particular service selected by the dialing step and also informing said toll switch of the type of billing operation to be employed.

3. The method of claim 2 wherein different second terminals are available for different services and the service and terminal can be selected using different assigned digits yy as well as the zip code.

4. The method of claim 1 wherein each terminal includes a FAX machine.

5. The method of claim 1 wherein each second terminal is provided with a separate interface unit, the said means of each second terminal being contained in the separate unit.

6. Apparatus for communicating between a first communication terminal and any selected one of a group of second remotely disposed compatible communication terminals using a designated communication service of a designated common carrier having at least one toll switch connectable via local telephone company central offices between the first terminal and any selected second terminal, each second terminal having at least one different postal zip code assigned thereto that designates the geographical location thereof, each second terminal being provided with means to receive a designated security code from a toll switch which identifies the designated service, means to record the time, date and type of call identified by the designated code, means to initiate receipt of any message transmitted thereto, means responsive to the end of any message transmitted thereto to terminate reception and to send an end of reception signal to said toll switch, said apparatus comprising:

[a] means at the first terminal for selecting any one of said second terminals;

[b] means at the first terminal for dialing the number 1-0xx-x17-00yy plus the zip code of the selected second terminal where xxx is the occasional user carrier access code for the said carrier and yy designates any two digits, each digit having a value from one to nine, other than the combination of five and five [55] as assigned by the designated common carrier to identify the selected communication service, the call progressing automatically through a local central office connected to the first terminal, at least one toll switch and a local central office connected to the selected second terminal;

[c] means for automatically sending an acknowledgement of receipt of the call from the selected second terminal to a toll switch;

[d] means, upon receipt of the acknowledgement by said toll switch, for automatically sending said security code from said toll switch to the selected second terminal;

[e] means for verifying at the selected second terminal upon receipt of the security code by the selected second terminal that the received security code authenticates the designated service;

[f] means for recording at the selected second terminal the time, date and type of call defined by the received security code;

[g] means for initiating receipt of the call at the selected second terminal;

[h] means for terminating such receipt at the selected second terminal when said call reception ends; and

[i] means for automatically sending an end of message signal from the selected second terminal whereby said toll switch records all billing information concerning the call.

* * * * *